United States Patent [19]
Richardson

[11] Patent Number: 5,860,726
[45] Date of Patent: Jan. 19, 1999

[54] ROTATOR MOUNTING SYSTEM

[75] Inventor: Jack Douglas Richardson, Pittsford, N.Y.

[73] Assignee: Star Headlight and Lantern Co. Inc., Avon, N.Y.

[21] Appl. No.: 851,132

[22] Filed: May 5, 1997

[51] Int. Cl.$^6$ .............................. F21V 21/30; F21V 15/04; B60Q 1/00
[52] U.S. Cl. .............................. 362/35; 362/369; 362/390
[58] Field of Search ................ 362/35, 369, 390

[56] References Cited

U.S. PATENT DOCUMENTS

| | | | |
|---|---|---|---|
| 3,065,342 | 11/1962 | Worden | 362/390 |
| 3,117,302 | 1/1964 | Cardarelli et al. . | |
| 3,235,721 | 2/1966 | Dickson | 362/369 |
| 3,327,110 | 6/1967 | Bladwin . | |
| 3,375,367 | 3/1968 | Woodcock | 362/390 |
| 3,784,809 | 1/1974 | Smith | 362/35 |
| 4,118,764 | 10/1978 | Bleiweiss et al. | 362/369 |
| 4,212,051 | 7/1980 | Kulik | 362/369 |
| 4,229,781 | 10/1980 | Hitora | 362/35 |
| 4,231,078 | 10/1980 | Hitora | 362/35 |
| 4,345,307 | 8/1982 | Mayer et al. | 362/369 |
| 4,437,145 | 3/1984 | Roller et al. . | |
| 4,633,375 | 12/1986 | Tres | 362/35 |
| 4,812,955 | 3/1989 | Beswick et al. . | |
| 5,426,417 | 6/1995 | Stanuch | 362/35 |
| 5,491,619 | 2/1996 | Gill | 362/390 |
| 5,523,933 | 6/1996 | Swanson | 362/390 |
| 5,613,765 | 3/1997 | Gill | 362/369 |

*Primary Examiner*—Sandra O'Shea
*Assistant Examiner*—Matthew J. Spark
*Attorney, Agent, or Firm*—M. Lukacher

[57] ABSTRACT

A resilient mount for rotating warning light systems includes a mounting base having a plurality of mounting feet, each of which includes a special grommet mounted within an aperture formed therein. The grommets are selectively shaped so as to absorb and dissipate substantially all shock loads which would ordinarily be delivered to the rotating warning light system, and particularly, to the fragile bulb itself. The resiliently mount further prevents noise from being transmitted from the rotating light back into the vehicle to which the mounting base is connected.

7 Claims, 2 Drawing Sheets

ROTATOR MOUNTING SYSTEM

BACKGROUND OF THE INVENTION

The present invention relates, in general, to a rotating warning light system and particularly, to a shock mounting system for isolating and protecting the fragile light bulbs mounted to such rotating warning lights, thereby increasing the reliability of the system, especially when used on vehicles.

In the past, various arrangements have been employed to provide shock isolating mounts for rotating warning light systems mounted to vehicles. It will be appreciated by those familiar with the art that, a main component of failure for such warning light systems are shock transmitted from the chassis of the vehicle to the rotating warning lights, and particularly harmful, to the bulb itself and the very fragile filaments. Such recurring shock cycles, being absorbed by the rotating warning light system, quite frequently result premature in failure of the bulb. Quite frequently, such failures occur at most inopportune times which may result in a highly dangerous situation to those workers in, or near, the vehicle to which the warning light is mounted. Many operators of such vehicles realize that frequent bulb failure is a fact and, accordingly, replace the bulbs on a fairly frequent schedule. Thus many bulbs are replaced regardless of whether or not the bulb has failed. Obviously, replacing bulbs on such a schedule is time consuming, as well as expensive. The expense is particularly dramatic when halogen bulbs are utilized for their cost is substantially more than a standard filament bulb such as has been commonly used for many years.

Some examples of shock absorbing mounting systems for warning light assemblies may be seen in the following patents:

U.S. Pat. No. 3,117,302 issued to Cardarelli et al on Jan. 7, 1964;

U.S. Pat. No. 3,327,110 issued to Baldwin on Jun. 20, 1967;

U.S. Pat. No. 4,212,051 issued to Kulik on Jul. 8, 1980;

U.S. Pat. No. 4,437,145 issued to Roller et al on Mar. 13, 1984;

U.S. Pat. No. 4,812,955 issued to Beswick et al on Mar. 14, 1989; and

U.S. Pat. No. 5,523,933 issued to Swanson on Jun. 4, 1996.

It is evident from a review of patents listed above that none deal with the combined problems of bulb breakage and the reduced life of the rotating motor assembly caused directly by shock loads transmitted to both the motor and bulb through the chassis of the vehicle to which the rotating light assembly is mounted.

SUMMARY OF THE INVENTION

The present invention provides an improved shock mounting assembly for rotating vehicle warning lights. The improved shock mounting assembly includes a generally L-shaped base member which provides three points of suspension via grommets mounted to apertures therein. Each of the grommets includes a resilient annular web which acts to insulate the bulb mounted in the rotating assembly from shocks transmitted through the vehicle's chassis and, further, to prevent noise from being broadcast from the gear train of the rotating assembly back to the vehicle itself, thus acting as a sound board.

DETAILED DESCRIPTION

Figure 1:
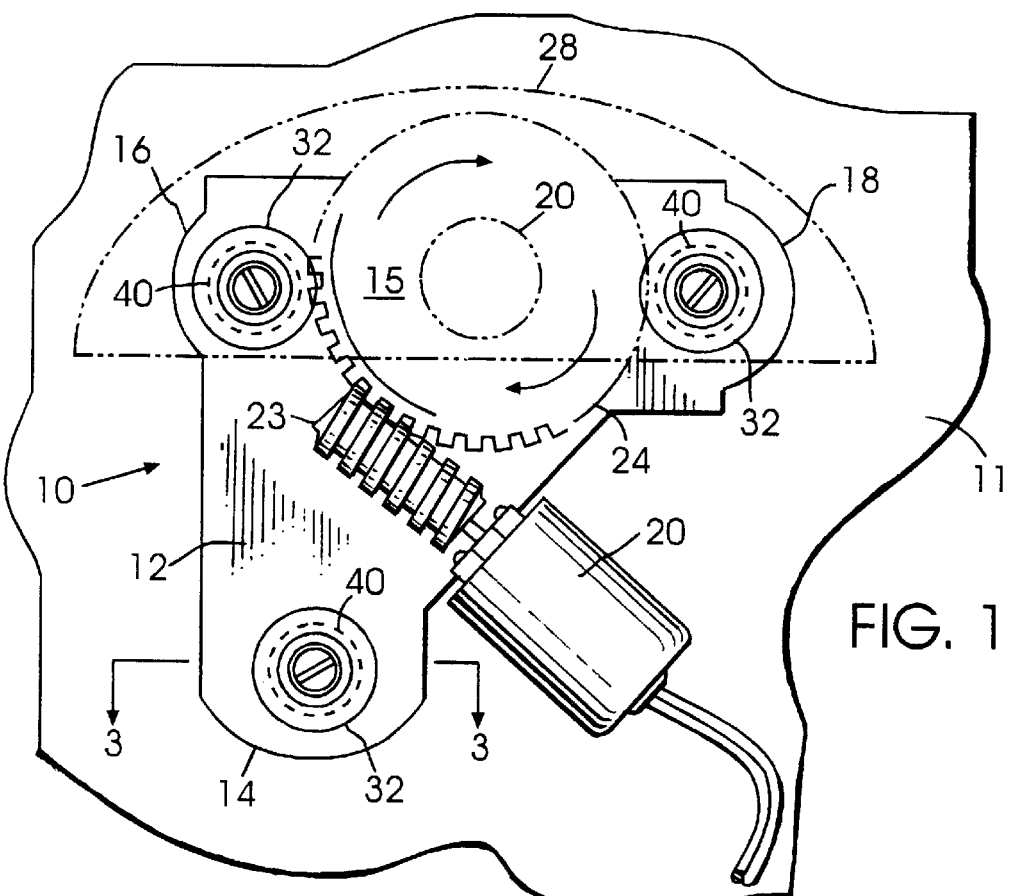
FIG. 1 is a top plan view of the shock mounting assembly for use in rotating warning lights according to the principals of the invention.
Figure 2:
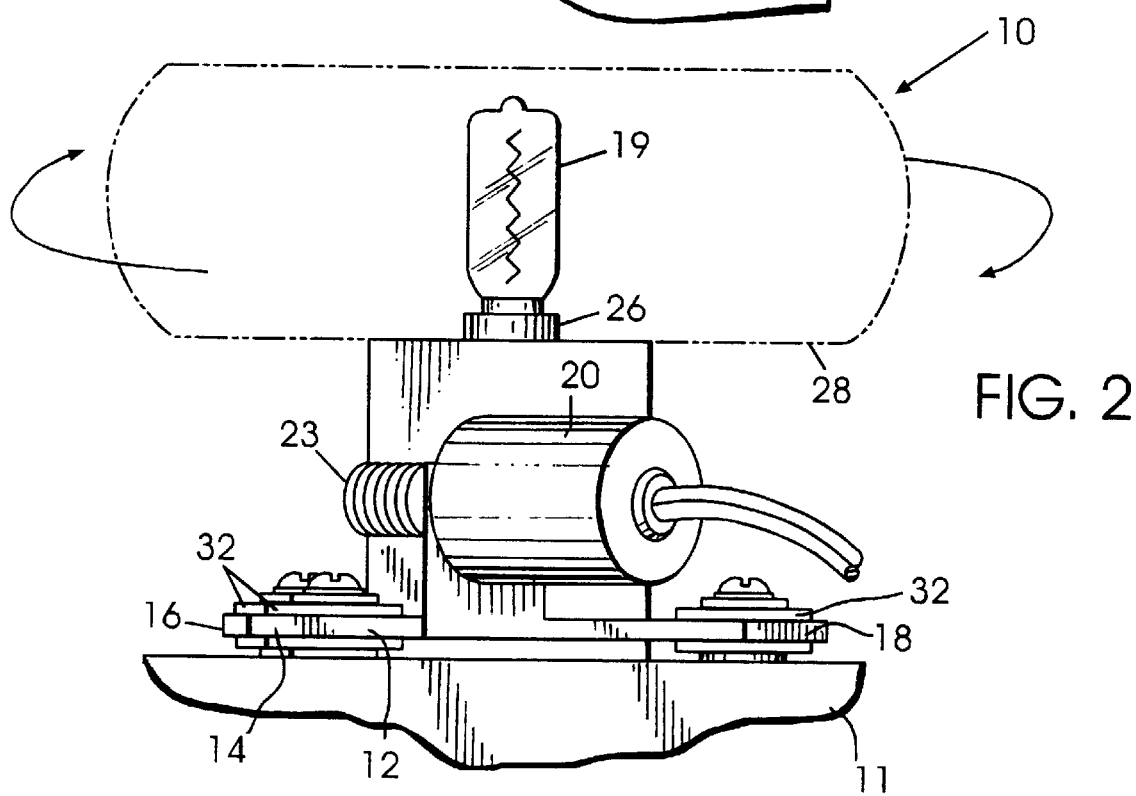
FIG. 2 is a front view thereof.

Referring to the drawings, a rotating warning light shock mounting assembly 10 for mounting to a vehicle 11 is provided. Assembly 10 includes a generally L-shaped base 12 having mounting feet 14, 16 and 18. An electric motor 20 includes a worm gear 23 which meshes with a spur gear 24 mounted to bulb socket 26 (as best seen in FIG. 1) which for lamp bulb 19 is rotatably mounted to socket 26 base 12 within reflector housing 28.

Figure 3:
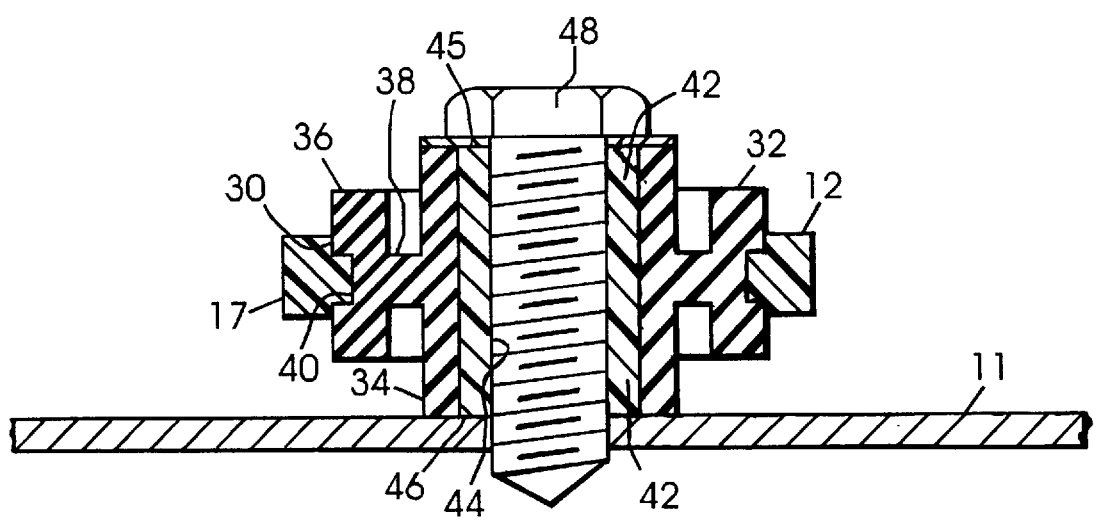
FIG. 3 is an enlarged sectional view taken along line 3—3 of FIG. 1.

As best illustrated in FIG. 3, a stepped aperture 30 is formed in each of the three mounting feet 14, 16 and 18, respectively, to which a special resilient grommet 32 is mounted. Grommets 32 are, preferably, formed from, a material having excellent shock and noise absorbing characteristics together with superior weathering properties, both features which are highly desirable. A low modulus of elasticity (ASTM- compression modulus about 137) urethane rubber suitably, the material, available from EAR division of Cabot Safety Corp. Newark, Del. 19713 U.S.A. under the tradename ISOLOSS may be used.

As seen in FIG. 3, grommet 32 includes an inner collar 34, an outer collar 36 and a web member 38 interconnected therebetween. Outer collar 36 includes a ring-groove 40 which is appropriately sized to snugly fit stepped aperture 30 of mounting feet 14, 16 and 18. A rigid annular elongate center spacer 42 is snugly fitted within aperture 44 formed in inner collar 34. And, as best seen in FIG. 3, spacer 42 has approximately the same length from its top surface to bottom surface as that of grommet 32. In other words when spacer 42 is assembled to grommet 32 their respective end surfaces are flush to each other.

An attachment screw 48 fitted through rigid annular spacer 42 couples resilient grommet 32, and base 12 mounted thereto, to the vehicle 11.

It will be appreciated that by so mounting each of the three legs 14, 16 and 18, respectively of L-shaped base 12 to insulative, resilient grommet 32 which, in turn, are mounted to rigid spacers 42, fixably coupled to a vehicle, that shock loads are filtered out by the resilient grommets and, therefore, not transmitted to the rotating lamp assembly. Further noise generally transmitted to the vehicle through the motor and gear train of the rotating assembly are attenuated out by the shock absorbing and insulative qualities of the grommets 32. For example, it will be appreciated by viewing FIG. 3 of the drawings, that base 12 is held a constant distance away from vehicle 11 by means of the length of and the annular spacer 42 matching that of grommet 32. Also, as annular spacer 42 is constructed from a rigid material, as previously referenced, it cannot be compressed by screw 48 via washer 45 during attachment of assembly 10 to vehicle 11. That is, by having the length of annular spacer 42 match that of grommet 32, when attachment screw 48 couples them both to vehicle 11, only compressive forces are applied to rigid spacer 42. Flexible grommet 32 is merely supported on annular spacer 42 and between screw 48 and the surface of the vehicle 11. Therefore, a shock originating somewhere in the vehicle's chassis and broadcast to the area of the rotating warning lamp assembly 10 is passed along to screw 48 and annular spacer 42. However, as resilient grommet 32 is supported on rigid annular spacer 42 and between screw 48 and the surface of vehicle 11. The vast majority of shock vibrations are passed to spacer 42 and screw 48. The vibrations that creep into resilient grommet 32 are absorbed by the interconnecting web 38 disposed between the inner collar 46 mounted to the annular spacer 42 and the outer collar 36 to which base 12 is mounted. The relatively thin cross-sectional dimension of web 38 allows for ease of movement of the of the mounted inner collar 46 with respect to the suspended outer collar 36, while simultaneously filtering those vibrations from being transmitted to outer collar 36 and base 12 mounted thereto. Accordingly, any vibrations delivered to rotating warning lamp assembly 10 are filtered out by the unique shape and construction of grommets 32 of the described mounting system. Additionally, any noise produced by the gear train of the rotating warning lamp assembly, e.g. meshing of spur gear 24 with worm gear 22 is also filtered out by the resilient grommet/mount.

Various modifications can be made to the invention as described above without departing from the spirit and scope of the invention. Accordingly, the foregoing description should be interpreted as illustrative and not in a limiting sense.

It is claimed:

1. A resilient mount for attaching a rotating warning lamp assembly to a vehicle comprising:

(a) a mounting base receiving and mounting the rotating warning lamp assembly, said mounting base having a plurality of spaced apart mounting legs, and each leg having near an end thereof an aperture;

(b) a plurality of resilient members in said aperture of each leg of said mounting base, each resilient member including an inner collar, an outer collar and a web member interconnected therebetween, said inner collar having an axial length between top and bottom surfaces thereof, said collars being disposed in interlocking relationship with said legs in said apertures of said mounting base legs; and (c) a substantially rigid, tubular spacer mounted to said inner collar of each of said resilient members in supporting relationship therewith for receiving an attachment member therethrough which connects said base to the vehicle, said tubular spacers, each having a length between top and bottom surfaces thereof substantially the same as the axial length of said inner collars of said resilient member, whereby upon attachment of said resilient mount to said vehicle, said rigid spacers support said resilient members while simultaneously preventing said resilient members from being distorted.

2. The resilient mount as set forth in claim 1 wherein said mounting base is substantially an L-shape, said legs being the sides of the L-shape.

3. The resilient mount as set forth in claim 2 wherein said legs are approximately of equal length.

4. The resilient mount claim 1 wherein said lamp assembly comprises a cylindrical housing for a socket for said lamp, a motor attached via a bracket to said base and extending outwardly of said base, said motor having a shaft and a first gear on said housing and a second gear on said shaft in engagement with said first gear.

5. The resilient mount as set forth in claim 1 wherein said apertures formed in said mounting legs are stepped.

6. The resilient mount as set forth in claim 5 wherein said outer collars of each of said resilient members define grooves received by said stepped portions of said aperture to provide said interlocking relationship.

7. The resilient mount as set forth in claim 1 wherein said resilient member is a urethane rubber molding.

* * * * *